(No Model.)
E. BENJAMIN.
BELT GUIDE WHEEL.
No. 402,554. Patented May 7, 1889.
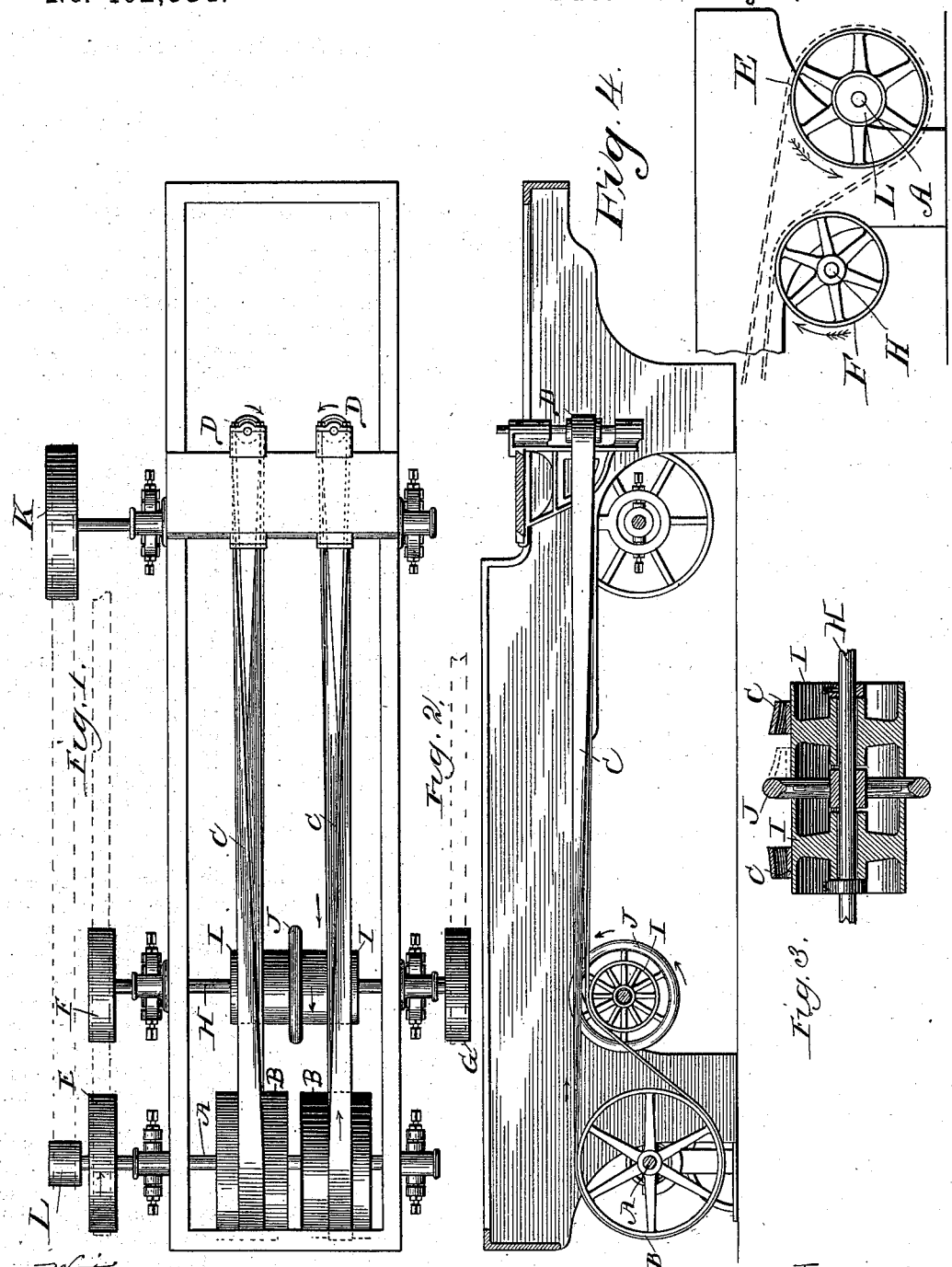

UNITED STATES PATENT OFFICE.

EDWIN BENJAMIN, OF SOUTH EVANSTON, ILLINOIS, ASSIGNOR TO THE BENJAMIN MACHINE COMPANY, OF ILLINOIS.

BELT-GUIDE WHEEL.

SPECIFICATION forming part of Letters Patent No. 402,554, dated May 7, 1889.

Application filed January 7, 1889. Serial No. 295,670. (No model.)

*To all whom it may concern:*

Be it known that I, EDWIN BENJAMIN, of South Evanston, in the county of Cook and State of Illinois, have invented certain new and useful Improvements in Belt-Guide Wheels, of which the following is a specification.

My invention is designed for application between belts running side by side in such close proximity to each other as to create danger that they may become entangled, as most frequently happens when the speed of the belts is high. A special need for such a device exists in planers and matchers for lumber, because the cutter-heads for making the tongues and grooves are driven by parallel belts, which move at a high speed and are necessarily very close together when working narrow lumber.

My invention is further specially fitted for application to planers and matchers, because the guide-wheel may be applied to the shafts already existing and in use for other purposes. I have therefore shown my device as applied to these belts. It has been usual to keep these belts separated by placing between them in a fixed guide—such as an iron rod or piece of gas-pipe—which effectually prevented the belts from being entangled or leaving their pulleys, but which produced so much friction between the edges of the belts and the guide as to soon destroy the belts. Flanges upon the driving-pulleys are also found to be destructive and ineffective by reason of the tendency of the belts to mount them when brought into contact with them by the moving of the cutter-heads close to each other, and the device herein shown is therefore intended to guide the belts without exerting such an injurious influence upon them.

In the drawings parts of a planing-machine are shown, sufficient to illustrate my invention as applied thereto, Figure 1 being a plan view; Fig. 2, a longitudinal vertical section; Fig. 3, a cross-section of the guide-wheel and the adjacent carrying-pulleys; and Fig. 4 is a side view of pulleys E F, Fig. 1, showing the manner in which the belt passes round them.

A is the main driving-shaft, upon which are wide-faced pulleys or drums B B, from which belts C C run to the matcher-head pulleys D D. The pulley L on shaft A and the pulley K, driven thereby, belong to the feed-works, and as the present invention does not relate thereto further description or illustration is omitted. The upper and lower cylinders are also driven from shaft A—one directly by the belt passing from pulley E and the other through the pulleys F and G on shaft H. The under side of the belt from pulley E makes contact with pulley F, as shown in Fig. 4, and hence drives it in the opposite direction, as indicated by the arrows. The belt driving the other cylinder runs from pulley G, as indicated by dotted lines. In order to distinguish more clearly the belts to which the guide-wheel is applied I have indicated the others by dotted lines only.

Upon the shaft H are two loose pulleys, I I, over which the belts C C pass, as shown, and between the pulleys and projecting between the belts is a guide-wheel, J, keyed or otherwise secured to the shaft H, so as to revolve with it.

The action of the guide-wheel is best seen by reference to Fig. 2. It travels in the same direction as the side of the belt which runs onto the driving-pulley B, (which of course is the side to be guided,) but does not exceed it in speed, as it would do if it formed a part of and constituted a flange for the pulleys I I. Hence it not only has less friction against the edges of the belts, but there is also less tendency in the belts to climb upon it.

I am aware that anti-friction rollers have been heretofore employed on belt guides and shifters and do not claim such as my invention; but such rollers differ from my device in that the face of the roller comes in contact with the belt, and if such a roller were applied between two belts whose adjacent sides were traveling in the same direction it would either not revolve or in revolving would create additional friction between it and one or the other belt.

I claim—

1. The combination, with two belts whose adjacent edges run in the same direction and in close proximity with each other, of a guide-wheel projecting between said edges and presenting its sides to said belt-edges, substantially as shown and described.

2. The combination, with two belts whose adjacent edges run in the same direction and in close proximity with each other, of a guide-wheel projecting between said edges, presenting its sides to said belt-edges and driven independently of its contact with the edges of the belts, as shown and described.

EDWIN BENJAMIN.

Witnesses:
J. I. VEEDER,
P. H. T. MASON.